(12) United States Patent
Ratnakaram et al.

(10) Patent No.: US 11,880,814 B2
(45) Date of Patent: Jan. 23, 2024

(54) IOT-ENABLED DIGITAL PAYMENTS

(71) Applicant: Bank of America Corporation, Charlotte, NC (US)

(72) Inventors: Udaya Kumar Raju Ratnakaram, Telangana (IN); Sriram Balasubramanian, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 23 days.

(21) Appl. No.: 17/568,841

(22) Filed: Jan. 5, 2022

(65) Prior Publication Data
US 2023/0214798 A1 Jul. 6, 2023

(51) Int. Cl.
*G06Q 20/10* (2012.01)
*G06Q 20/30* (2012.01)
*G06Q 20/40* (2012.01)

(52) U.S. Cl.
CPC ........... *G06Q 20/10* (2013.01); *G06Q 20/308* (2020.05); *G06Q 20/40* (2013.01)

(58) Field of Classification Search
CPC ....... G06Q 20/10; G06Q 20/308; G06Q 20/40
USPC .......................................................... 705/44
See application file for complete search history.

(56) References Cited

U.S. PATENT DOCUMENTS

| | | | |
|---|---|---|---|
| 8,256,667 B2 | 9/2012 | Poznansky et al. | |
| 10,158,614 B2 * | 12/2018 | Castinado | H04L 51/18 |
| 10,832,665 B2 | 11/2020 | Barnett, Jr. | |
| 2015/0120564 A1 * | 4/2015 | Smith | G06Q 20/042 |
| | | | 705/45 |
| 2015/0149354 A1 * | 5/2015 | McCoy | G06Q 20/108 |
| | | | 705/42 |
| 2017/0124541 A1 * | 5/2017 | Aggarwal | G06Q 20/102 |
| 2020/0184434 A1 * | 6/2020 | Evans | G06Q 20/102 |
| 2021/0041855 A1 * | 2/2021 | Kursun | G06N 20/00 |
| 2022/0230149 A1 * | 7/2022 | Greenbacker | G06Q 20/425 |
| 2022/0230155 A1 * | 7/2022 | Greenbacker | G06Q 20/308 |
| 2022/0230236 A1 * | 7/2022 | Dolan | G06F 18/2411 |

FOREIGN PATENT DOCUMENTS

WO WO-2018081606 A1 * 5/2018 .............. F24F 11/47

* cited by examiner

*Primary Examiner* — Hai Tran
(74) *Attorney, Agent, or Firm* — Banner & Witcoff, Ltd.

(57) ABSTRACT

Aspects of the disclosure relate to an IoT (Internet of Things) enabled device that initiates online or offline payment requests. In some arrangements, the IoT payment device may be managed through a central dashboard available via a stationary computing device or mobile device. In an embodiment, an IoT payment device may provide real-time updates that include data such as device function, alerts on maintenance needs, and direct contact with the service provider for any requests related to the IoT devices.

26 Claims, 5 Drawing Sheets

IOT-ENABLED DIGITAL PAYMENTS

BACKGROUND

Aspects of the disclosure relate to electrical computers, systems, and devices for making digital payments. Currently, users make digital payments through a service provider's platform, which typically includes an authentication process to initiate a payment request. It can be problematic at times and time consuming for users to access each service provider's payment platform to initiate various payment requests through the different service providers' platforms.

For instance, a user may use multiple financial institution platforms to make monthly payments for various living costs or services including electricity, gas, water, sewer, housing (rent or mortgage), phone, credit card, and health care. Connecting to multiple financial institution payment platforms may be time consuming as typically a user may allocate a particular amount of time each month to make payments through all of these different platform providers. Connecting to multiple financial institutions to make all these payments is frustrating as each may have unique authentication processes to complete in order to initiate payment requests.

There is a need to develop a system to streamline the digital payments process for users. The system should reduce a user's time commitment and improve the user's digital payment experience.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address one or more shortcomings in the industry by providing a payment device to initiate digital payments. The payment device may be an IoT (Internet of Things) enabled device that may initiate an online or offline payment request. In some arrangements, the IoT payment device may be managed through a central dashboard available via a stationary computing device or mobile device. In an embodiment, an IoT payment device may provide real-time updates that include data such as device function, alerts on maintenance needs, and direct contact with the service provider for any requests related to the IoT devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is noted that various connections between elements are discussed in the following description. It is also noted that these connections are general and, unless specified otherwise, may be direct or indirect, wired or wireless, and that the specification is not intended to be limiting.

Figure 1:
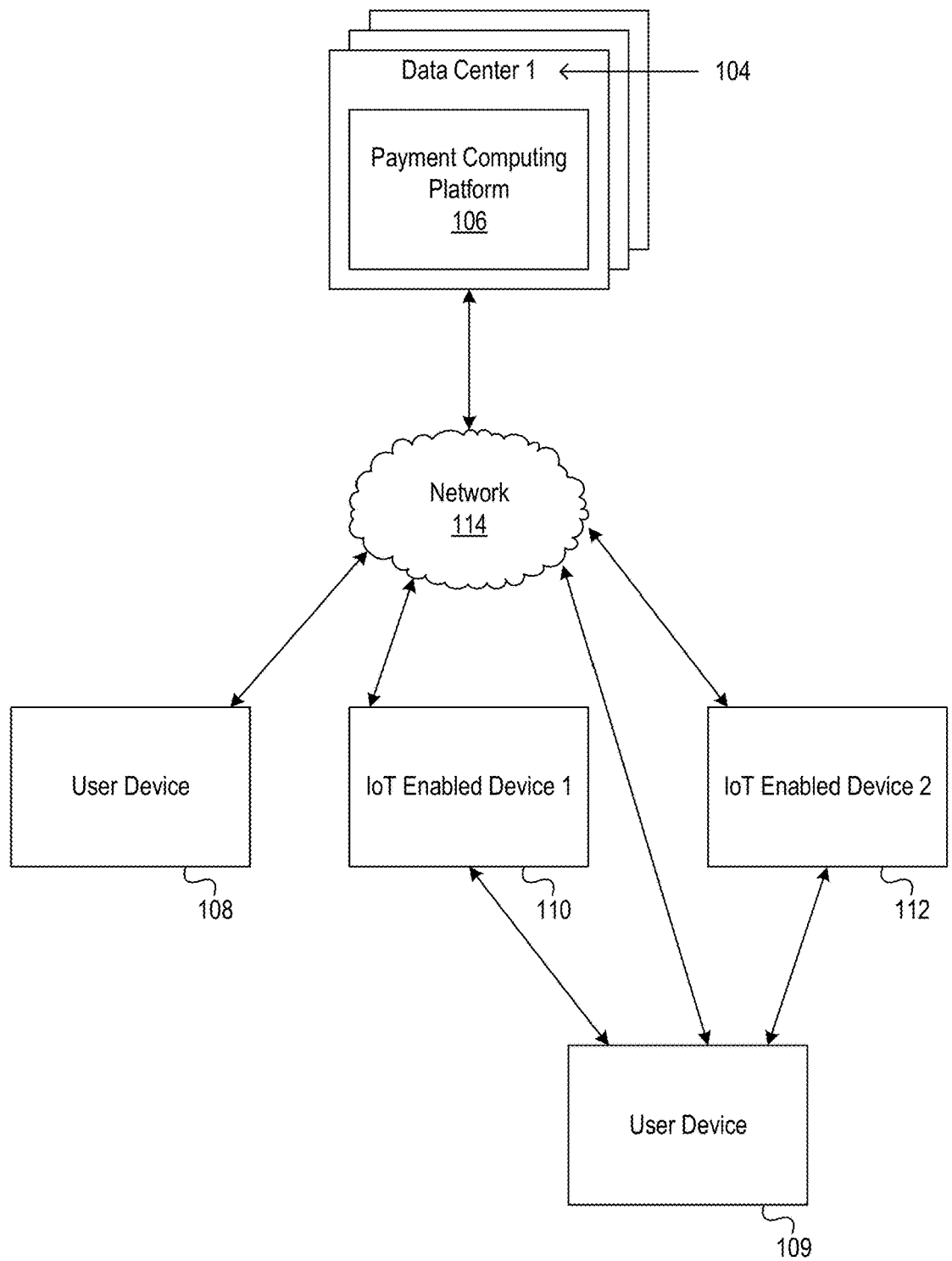
FIG. 1 depicts an illustrative environment in which an IoT payment is provided in accordance with one or more illustrative aspects described herein.

FIG. 1 depicts an illustrative computing environment 100 for using an IoT enabled devices with various embodiments of the disclosure. Computing environment 100 may include one or more data centers and one or more computing devices, including computing devices located at or within such data centers and computing devices not located at or within such data centers. For example, computing environment 100 may include a first data center 104. Data center 104 may include a payment computing platform 106. Computing environment 100 also may include user devices 108 and 109, a first IoT enabled device 110, and a second IoT enabled device 112.

Data center 104 may be a distinct and physically separate data center operated by and/or otherwise associated with an organization, such as a financial institution. In addition, data center 104 may house a plurality of server computers and various other computers, network components, and devices.

In an aspect of the disclosure, payment computing platform 106 may be configured to provide one or more portal interfaces to one or more client devices and/or may be configured to authorize and/or accept one or more payment transactions associated with acceptance devices such as IoT enabled device 110 and 112. In another aspect of the disclosure, payment computing platform 106 may be configured to authenticate user devices or IoT enabled devices as needed.

In some arrangements, data center 104 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. In an embodiment, client account server(s) may store information regarding customers' outstanding bills and obligations. The information may include balance due on each account along with due dates for payment and other customer account specific information. In an embodiment, the information may be accessible by the customer through an IoT enabled device or user device.

Additionally or alternatively, client account server(s) may include and/or integrate with one or more client support servers and/or devices, such as one or more customer service representative devices used by one or more customer service representatives of an organization (which may, e.g., be a financial institution operating data center), to connect one or more customers of the organization with one or more customer service representatives of the organization via one or more telephone support sessions, chat support sessions, and/or other client support sessions.

In one or more arrangements, a user device 108 or 109 may be any type of computing device capable of receiving a user interface, receiving input via the user interface, and communicating the received input to one or more other computing devices. For example, a user device may, in some instances, be and/or include server computers, desktop computers, laptop computers, tablet computers, smart phones, or the like that may include one or more processors, memories, communication interfaces, storage devices, and/or other components. As noted above, and as illustrated in detail below, a user device may, in some instances, be one or more special-purpose computing devices configured to perform specific functions. In an embodiment, user device 108 may receive alerts or communications from payment computing platform 106 regarding current or past transactions.

In an embodiment, user device 108 or 109 may communicate with payment computing platform 106 to provide a user with information related to current or previous transactions. In some instances, in addition to being configured to provide uses with transactional information, payment computing platform 106 also may be configured to provide a mobile banking portal associated with the financial institution to various customers of the financial institution and/or their associated mobile computing devices. Such portals may, for instance, provide customers of the financial institution with access to financial account information (e.g., account balance information, purchase transactions, account statements, recent transaction history information, or the like) and/or may provide customers of the financial institution with menus, controls, and/or other options to schedule and/or execute various transactions (e.g., online bill pay transactions, person-to-person funds transfer transactions, or the like.

Figure 2:
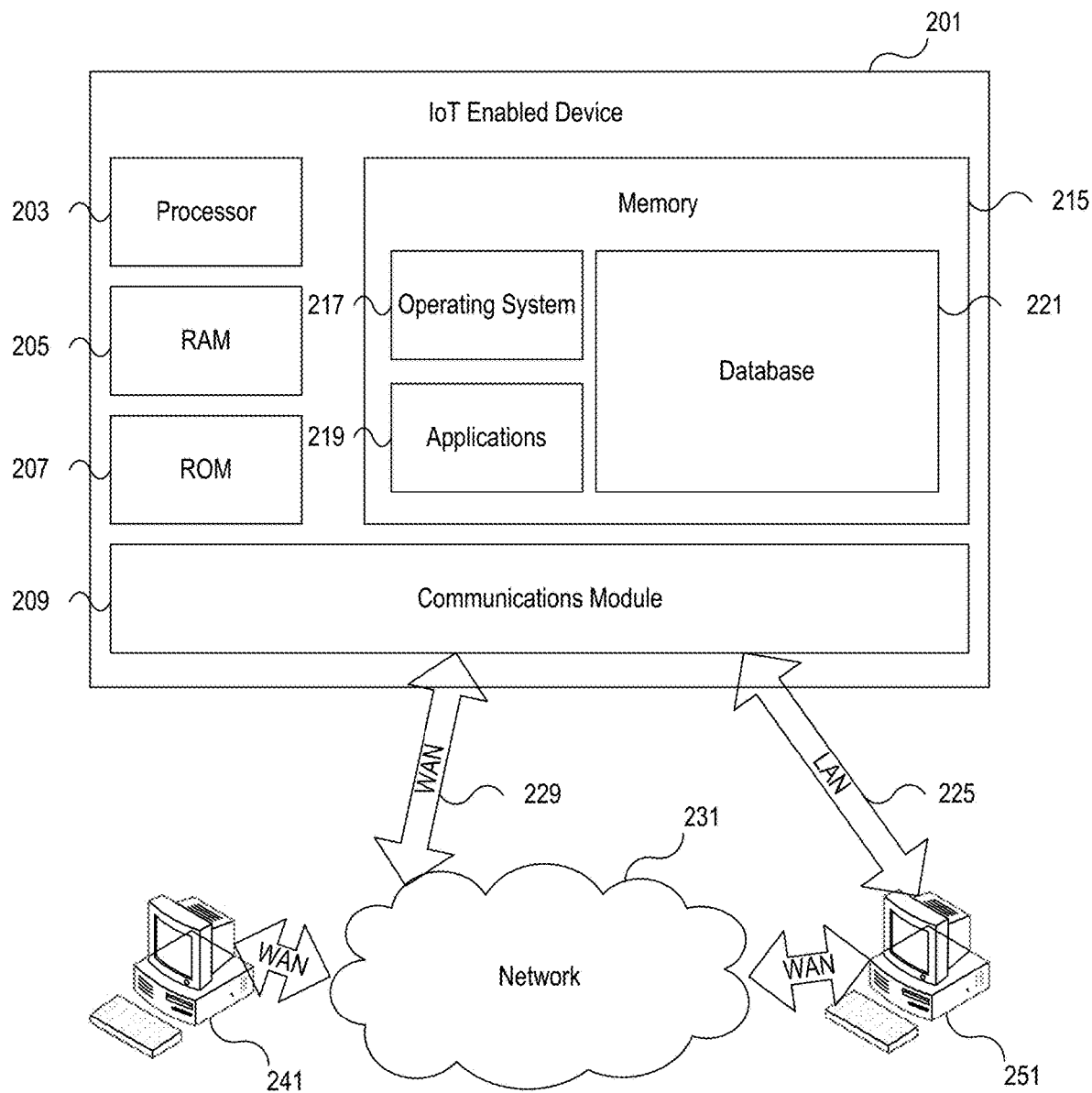
FIG. 2 shows hardware elements of an IoT enabled device in accordance with one or more illustrative aspects described herein.

FIG. 2 shows hardware elements of an IoT enabled device 201 that may be used to implement various embodiments of the disclosure. IoT enabled device 201 may include a processor 203 for controlling overall operation of IoT enabled device 201 and its associated components, including Random Access Memory (RAM) 205, Read-Only Memory (ROM) 207, communications module 209, and memory 215. IoT enabled device 201 may include a variety of computer readable media. Computer readable media may be any available media that may be accessed by IoT enabled device 201, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed IoT enabled device 201.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor associated with an IoT enabled device 201. Such a processor may execute computer-executable instructions stored on a computer-readable medium.

Software may be stored within memory 215 and/or storage to provide instructions to processor 203 for enabling IoT enabled device 201 to perform various functions as discussed herein. For example, memory 215 may store software used by IoT enabled device 201, such as operating system 217, application programs 219, and associated database 221. In addition, some or all of the computer executable instructions for IoT enabled device 201 may be embodied in hardware or firmware. Although not shown, RAM 205 may include one or more applications representing the application data stored in RAM 205 while IoT enabled device 201 is on and corresponding software applications (e.g., software tasks) are running on IoT enabled device 201.

Communications module 209 may include a microphone, keypad, touch screen, and/or stylus through which a user IoT enabled device 201 may provide input, and may include one or more speakers for providing audio output and a video display device for providing textual, audiovisual and/or graphical output.

IoT enabled device 201 may operate in a networked environment supporting connections to one or more remote computing devices, such as computing devices 241 and 251. Computing devices 241 and 251 may be personal computing devices or servers that include any or all of the elements described above relative to IoT enabled device 201.

The network connections depicted in FIG. 2 may include Local Area Network (LAN) 225 and Wide Area Network (WAN) 229, as well as other networks. When used in a LAN networking environment, IoT enabled device 201 may be connected to LAN 225 through a network interface or adapter in communications module 209. When used in a WAN networking environment, IoT enabled device 201 may include a modem in communications module 209 or other means for establishing communications over WAN 229, such as network 231 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The network 231 may comprise the communication links, an in-home network, a network provider's wireless, coaxial, fiber, or hybrid fiber/coaxial distribution system (e.g., a DOCSIS network), or any other desired network. The IoT enabled device and/or user device may comprise location-detecting devices, such as global positioning system (GPS) microprocessors, which may be configured to receive and process global positioning signals and determine, with possible assistance from an external server and antenna, a geographic position of the IoT enabled device and/or user device.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Although FIG. 2 shows an example hardware configuration, one or more of the elements of the IoT enabled device 201 and/or user device may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing IoT enabled device 201 may store computer-executable instructions that, when executed by the processor 203, cause the IoT enabled device 201 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Figure 3:
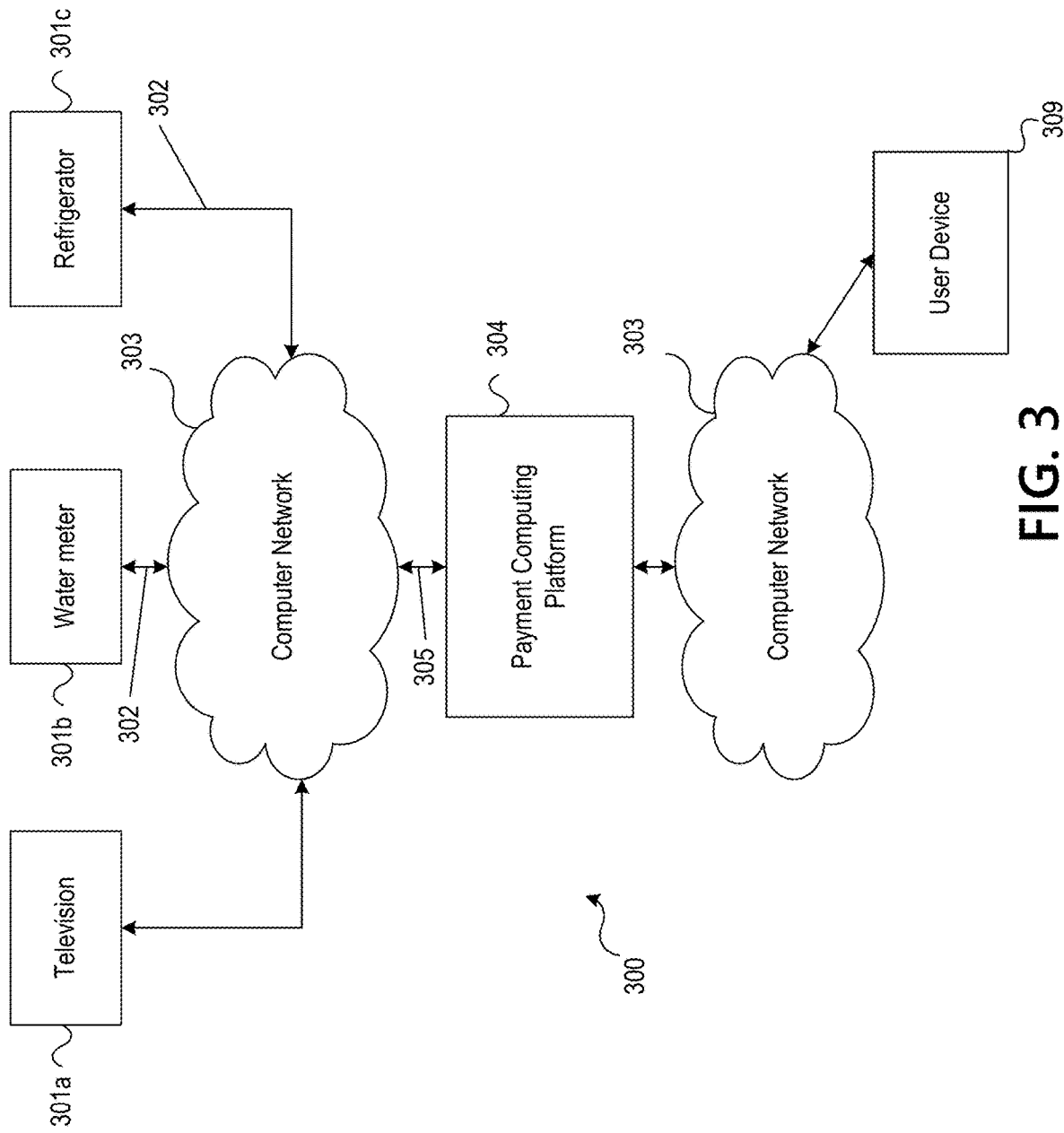
FIG. 3 depicts an illustrative block diagram of various IoT enabled devices that may be used to implement the processes and functions of certain aspects of the present disclosure in accordance with one or more example embodiments.

FIG. 3 depicts an illustrative block diagram of various IoT enabled devices that may be used to implement the processes and functions of certain aspects of the present disclosure in accordance with one or more example embodiments. Referring to FIG. 3, illustrative system 300 may be used for implementing example embodiments according to the present disclosure. As illustrated, system 300 may include one or more IoT enabled devices 301a, 301b, and 301c. As shown in FIG. 3, IoT enabled device 301a comprises a television, IoT enabled device 301b comprises a water meter, and IoT enabled device 301c comprises a refrigerator. In accordance with an embodiment of the disclosure, each of the IoT devices 301a, 301b, or 301c allows a user to initiate an online or offline payment request. In an embodiment, a payment may be managed through a central dashboard that may be displayed on a display of the IoT device 301a, 301b, or 301c or on a user device in communication with IoT device 301a, 301b, or 301c.

In system 300, payment computing platform 304 may be executed on a server, processor, computer, or data processing device, or combination of the same, configured to perform the functions and/or processes described herein. Payment computing platform 304 may be used to receive natural language input data, build or train machine learning models, analyze natural language input data received using the one or more processes described herein, generate an output, receive user feedback, update and/or validate one or more machine learning datasets, and the like.

Computer network 303 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 302 and 305 may be communications links suitable for communicating between IoT device 301a, 301b, and 301c and payment computing platform 304, such as network links, dial-up links, wireless links, hard-wired links, as well as network types developed in the future, and the like.

In an aspect of the disclosure, a user may subscribe to various television channels and may make payments for the subscription service to a television channel streaming service provider. With an IoT enabled television 301a, the user may make payments for the television streaming service provider through the IoT enabled television 301a without the need to make such payments through the payment portal of the television streaming service provider. In an embodiment, a user may initiate payment through a mobile device such as user device 309. The IoT enabled television 301a may communicate with the mobile device 309 through NFC, Bluetooth, or other communication protocol. The payment may be an online or offline payment transaction depending on time of day or agreed upon arrangement with the service provider.

In another aspect of the disclosure, an IoT enabled device 301a, 301b, or 301c may be a device that provides the service directly to the user. For instance, an electric utility meter may be an IoT enabled device 301b. In an embodiment, a digital payment request may be initiated by activating a switch physically located on the utility meter (IoT enabled device 301b). In other embodiment, a user device may wirelessly connect to IoT enabled device 301b to initiate the digital payment. In both embodiments, the IoT enabled device 301b may communicate with a user's digital device through which a digital payment may be authorized and executed.

In an aspect of the disclosure, a payment dashboard may be used to store or queue any initiated IoT device transactions for later authorization and payment to service providers. In an embodiment, the queued transactions may be payed based on a user defined schedule or time period.

Figure 4:
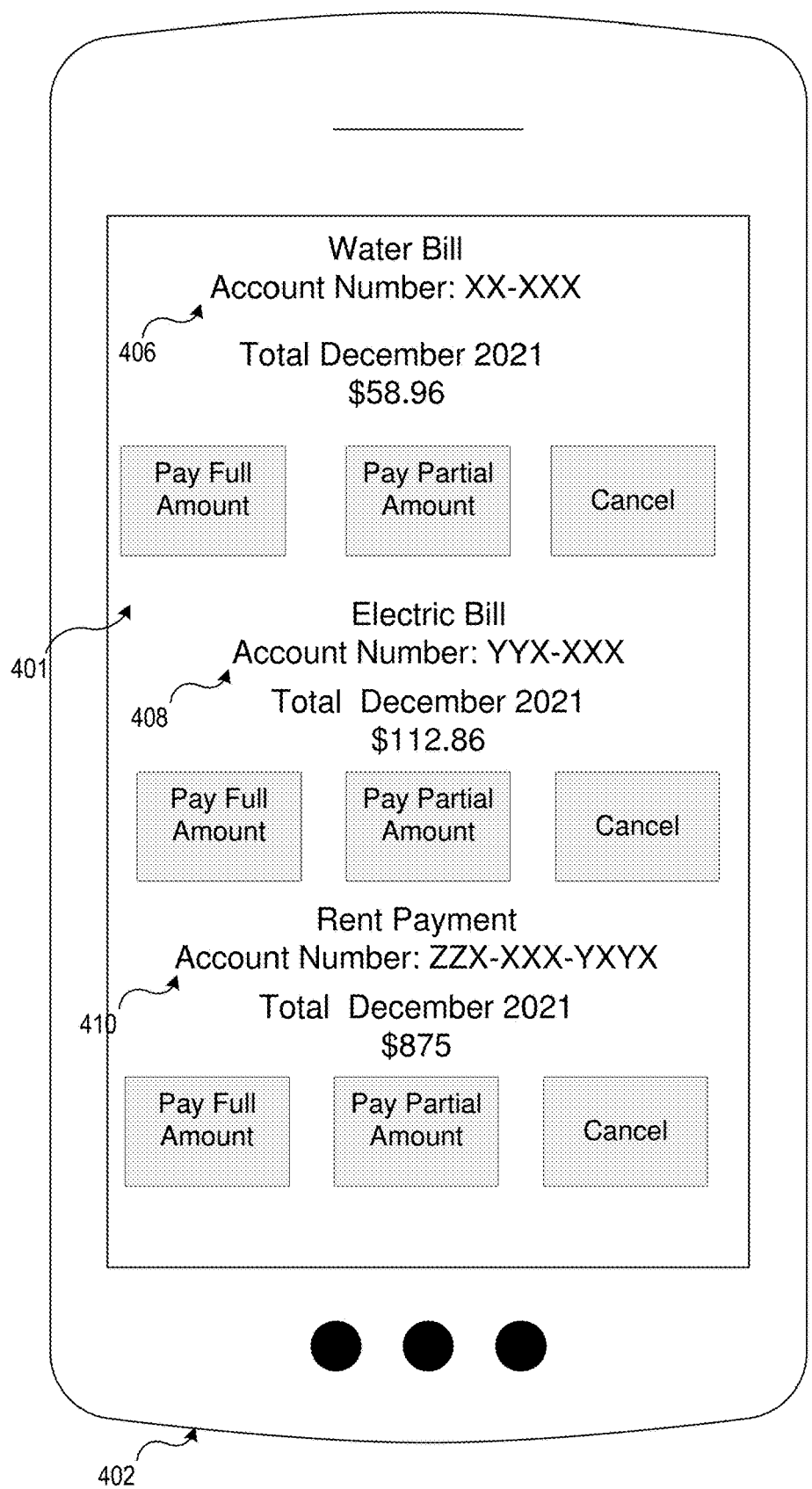
FIG. 4. illustrates a central dashboard in accordance with various aspects of this disclosure.

FIG. 4. illustrates a central dashboard in accordance with various aspects of this disclosure. As show in FIG. 4, a user may display and interact with a central dashboard 401 on a user device such a mobile device 402. As show in FIG. 4, the central dashboard 401 may be updated in real time to display different accounts from different service providers for which a user has a payment balance. For instance, central dashboard 401 includes three different accounts of a user, that currently have a balance: a water service provider account 406, an electric service provider account 408, and a rent service provider account 410. As shown in FIG. 4, each of the accounts may be fully paid or partially paid by a user through an IoT enabled device. In an embodiment, once a payment has been approved by payment computing platform 304, the central dashboard is updated in real time to reflect the updated account balances.

In an embodiment, a user may throughout a day or week make IoT device enabled transactions to different vendors or service providers. These initiated transactions may be stored for final review by a user in the central dashboard accessible by the user. Upon final review of the initiated transactions, a user may execute all or some of the stored transactions. For instance, a user may decide to pay either a full payment 404 or a partial payment 406 to a service provider such as a water company to make payment on their outstanding account. In an aspect of the disclosure, upon initiation of a transaction with an IoT enabled device, a verification communication may be forwarded to a user's mobile device to approve or authenticate the transaction. This additional step may verify that an authorized user is initiating a legitimate transaction.

In an embodiment, an IoT device may transmit a notification to the user through their mobile device a transaction receipt of a full or partial payment to a vendor or service provider. The notification may take numerous forms such an email, text, or phone message.

In some embodiments, artificial intelligence or machine learning may be used to determine a user's patterns concerning payment transactions. In some instances, a Long Short-Term Memory (LSTM) neural network may be used to correlate transaction data with time of month or frequency of payments. In other instances, deep scanning may be used to analyze relationship history and frequency of transactions. The use of machine learning and the analysis of payment transaction may determine patterns of user payment and be used to remind users of potential upcoming payment due dates through the IoT enabled devices.

Figure 5:
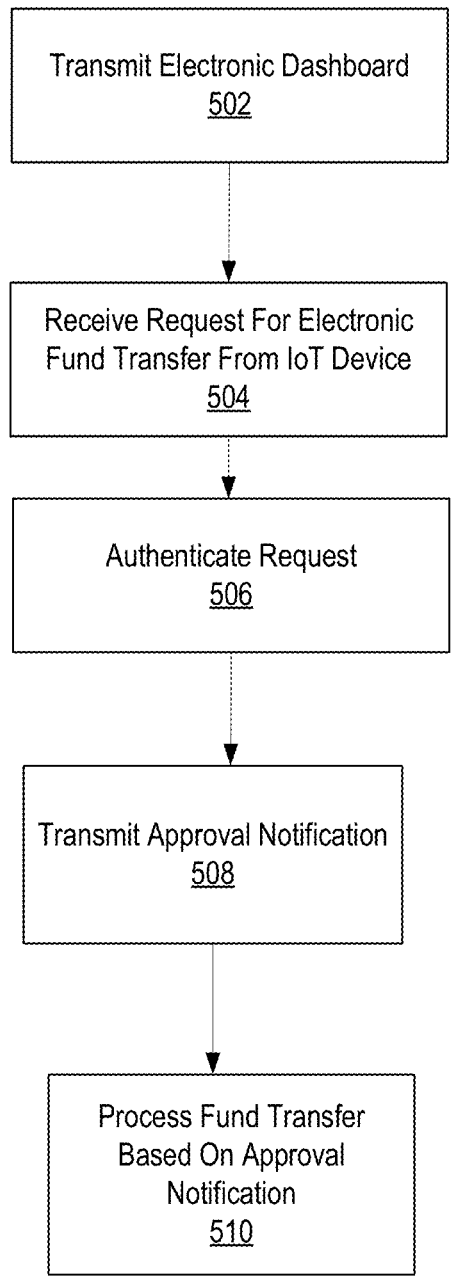
FIG. 5 illustrates a method for processing account payments through an IoT device in accordance with an aspect of the disclosure.

In an embodiment, a similar user interface for each of enabled IoT devices may be utilized to improve user experience. For instance, an IoT enabled television with the digital payment features of the present disclosure may utilize a similar user interface as an IoT enabled utility meter. This may simplify use for users and reduce overall transaction times a user may need to spend on bill payments FIG. 5 illustrates a method for processing account payments through an IoT device in accordance with an aspect of the disclosure. In step 502, a payment platform may transmit to an IoT device an electronic dashboard. The electronic dashboard may include payment accounts and associated amounts owed to different providers. The electronic dashboard may be updated in real time. In step 504, a computing platform may receive a request for an electronic fund transfer to pay an associated user account from an enabled IoT device The payment request may be to pay at least one payment account associated with at least one service provider utilized by the user. The payment request may be for at least a portion of an amount owed to the at least one service provider.

In an embodiment, in step 506 a payment platform may authenticate the request, based on an analysis of the received incoming request for an electronic fund transfer, the financial account, and the at least one payment account associated with the at least one service provider. In step 508, the payment platform may transmit an approval notification to the IoT device. In step 510, based on the approval notification, the payment platform may process the electronic fund transfer from the financial account associated with the user to the at least one payment account associated with the at least one service provider.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computing platform for processing account payments associated with a user, the computing platform comprising:
at least one processor; and
memory storing computer-readable instructions that, when executed by the at least one processor, cause the computing platform to:
transmit, to a first Internet of Things (IoT) device, an electronic dashboard, wherein the first IoT device supports a first service directly to the user provided by a first service provider, wherein the electronic dashboard includes a first payment account for the first service provider and a second payment account for a second service provider, and wherein a second IoT device supports a second service directly to the user provided by the second service provider;

receive, from the first IoT device and in accordance with interaction between the first IoT device and a user device via a wireless communication channel, a first incoming request to electronic fund transfer from a financial account associated with the user to the first payment account associated with the first service provider, at least a portion of an amount owed to the first service provider;

authenticate, based on the first received incoming request to electronic fund transfer, the financial account and the first payment account associated with the first service provider;

transmit an approval notification to the first IoT device;

based on the approval notification, process the electronic fund transfer from the financial account associated with the user to the first payment account associated with the first service provider;

transmit, to the second IoT device, the electronic dashboard;

receive, from the second IoT device, a second incoming request to electronic fund transfer from the financial account associated with the user to the first payment account associated with the first service provider;

determine, utilizing a Long Short-Term Memory (LSTM) neural network, a user payment pattern concerning payment transactions by the user, wherein the determining comprises deep scanning to analyze a relationship history and a frequency of the payment transactions;

generate a reminder notification to the user about a potential upcoming payment due date through at least one IoT device; and transmit, in response to the generating, the electronic dashboard, to the first IoT device, at a determined time in accordance with the user payment pattern.

2. The computing platform of claim 1, wherein the computer-readable instructions, when executed by the at least one processor, cause the computing platform to update the electronic dashboard based on the processed electronic fund transfer from the financial account associated with the user to at least one payment account associated with at least one service provider.

3. The computing platform of claim 1, wherein the computer-readable instructions, when executed by the at least one processor, cause the computing platform to transmit to the first IoT device a transaction record of a completed electronic fund transfer.

4. The computing platform of claim 1, wherein the computer-readable instructions, when executed by the at least one processor, cause the computing platform to connected to a portal of at least one service provider.

5. The computing platform of claim 3, wherein a LSTM neural network correlates payment transactions of the user to determine reminder notifications as to potential upcoming payment due dates.

6. The computing platform of claim 1, wherein the computer-readable instructions, when executed by the at least one processor, cause the computing platform to queue incoming requests for electronic fund transfers for processing at a user defined time period.

7. The computing platform of claim 6, wherein the user defined time period comprises once a month.

8. The computing platform of claim 6, wherein the user defined time period comprises once a week.

9. The computing platform of claim 1, wherein the at least a portion of an amount owed to the first service provider comprises full payment.

10. The computing platform of claim 1, wherein the computer-readable instructions, when executed by the at least one processor, cause the computing platform to update the electronic dashboard in real-time based on account activity to payment accounts of service different providers.

11. The computing platform of claim 1, wherein the computer-readable instructions, when executed by the at least one processor, cause the computing platform to:

receive from the first IoT device the incoming request to electronic fund transfer from the financial account associated with the user to the second payment account associated with the second service provider for the second service supported by the second IoT device.

12. The computing platform of claim 1, wherein the computer-readable instructions, when executed by the at least one processor, cause the computing platform to:

update, in real-time, the electronic dashboard in response to the second incoming request from the second IoT device.

13. A method comprising:

transmitting, to a first Internet of Things (IoT) device by a computing platform, an electronic dashboard, wherein the first IoT device supports a first service directly to a user provided by a first service provider, wherein the electronic dashboard includes a first payment account for the first service provider and a second payment account for a second service provider, and wherein a second IoT device supports a second service directly to the user provided by the second service provider;

generating, by the first IoT device with a user device through a communication module, a wireless signal over a wireless communications channel conveying the electronic dashboard;

receiving, by the first IoT device from the user device via the communication channel, a payment indication to initiate payment for first and second services supported by the first and second IoT devices, respectively;

receiving, by the computing platform from the first IoT device, an incoming request to electronic fund transfer from a financial account associated with the user to at least one payment account associated with at least one service provider, at least a portion of an amount owed to the at least one provider;

authenticating, based on the received incoming request to electronic fund transfer, the financial account and the at least one payment account associated with the at least one provider;

transmitting an approval notification to the IoT device; and based on the approval notification, processing the electronic fund transfer from the financial account associated with the user to the at least one payment account associated with the at least one provider;

transmit, to the second IoT device, the electronic dashboard;

receive, from the second IoT device, a second incoming request to electronic fund transfer from the financial account associated with the user to the first payment account associated with the first service provider;

determine, utilizing a Long Short-Term Memory (LSTM) neural network, a user payment pattern concerning payment transactions by the user, wherein the determining comprises deep scanning to analyze a relationship history and a frequency of the payment transactions;

generate a reminder notification to the user about a potential upcoming payment due date through at least one IoT device; and transmit, in response to the generating, the electronic dashboard, to the first IoT device, at a determined time in accordance with the user payment pattern.

14. The method of claim 13, further comprising updating the electronic dashboard based on a processed electronic fund transfer of funds from the financial account associated with the user to the at least one payment account associated with the at least one provider.

15. The method of claim 13, further comprising transmitting to the first IoT device a transaction record of a completed electronic fund transfer.

16. The method of claim 13, further comprising connecting the first IoT device to a portal of the at least one service provider.

17. The method of claim 15, further comprising correlating payment transactions of the user to determine reminder notifications as to potential upcoming payment due dates.

18. The method of claim 13, further comprising queueing incoming requests for electronic fund transfers for processing at a user defined time period.

19. The method of claim 13, wherein the authenticating further comprises:
forwarding, to the user device, a verification communication to authenticate the received incoming request.

20. The method of claim 13 further comprising:
provide, by one of a plurality of IoT devices, a real-time update directed to a device function of said one of the plurality of IoT devices.

21. The method of claim 20 further comprising:
provide, by said one of the plurality of IoT devices, an alert directed to a maintenance need of said one of the plurality of IoT devices.

22. The method of claim 21 further comprising:
provide a direct contact with an associated service provider of said one of the plurality of IoT devices for any request related to said one of the plurality of IoT devices.

23. A non-transitory machine readable storage medium comprising machine-readable instructions for causing a processor to execute a method of processing account payments associated with a user comprising:
transmitting transmit to a first Internet of Things (IoT) device, an electronic dashboard, wherein the first IoT device supports a first service directly to the user provided by a first service provider, wherein the electronic dashboard includes a first payment account for the service provider and a second payment account for a second service provider, and wherein a second IoT device supports a second service directly to the user provided by the second service provider;

receiving, from the first IoT device and in accordance with interaction between the first IoT device and a user device via a wireless communication channel, an incoming request to electronic fund transfer from a financial account associated with the user to the first payment account associated with the first service provider;

authenticating, based on the received incoming request to electronic fund transfer, the financial account and the first payment account associated with the first service provider;

transmitting an approval notification to the first IoT device;

based on the approval notification, processing the electronic fund transfer from the financial account associated with the user to the first payment account associated with the first service provider;

transmitting, to the second IoT device, the electronic dashboard;

receiving, from the second IoT device, a second incoming request to electronic fund transfer from the financial account associated with the user to the first payment account associated with the first service provider;

determining, utilizing a Long Short-Term Memory (LSTM) neural network, a user payment pattern concerning payment transactions by the user, wherein the determining comprises deep scanning to analyze a relationship history and a frequency of the payment transactions;

generating a reminder notification to the user about a potential upcoming payment due date through at least one IoT device; and transmitting, in response to the generating, the electronic dashboard, to the first IoT device, at a determined time in accordance with the user payment pattern.

24. The non-transitory machine readable storage medium of claim 23, wherein the memory storing computer-readable instructions that, when executed by the processor, cause the processor to update the electronic dashboard based on the processed electronic fund transfer from the financial account associated with the user to the first payment account associated with the first service provider.

25. The non-transitory machine readable storage medium of claim 23, cause the processor to transmit to the first IoT device a transaction record of a completed fund transfer.

26. The non-transitory machine readable storage medium of claim 23, wherein the memory storing computer-readable instructions that, when executed by the processor, cause the processor to update the electronic dashboard in real-time based on account activity to payment accounts of the different service providers.

* * * * *